United States Patent [19]

Hanson

[11] Patent Number: 5,058,291

[45] Date of Patent: Oct. 22, 1991

[54] PADDING DEVICE

[75] Inventor: Chris A. Hanson, Boulder, Colo.

[73] Assignee: Alden Laboratories, Inc., Boulder, Colo.

[21] Appl. No.: 573,365

[22] Filed: Aug. 27, 1990

Related U.S. Application Data

[62] Division of Ser. No. 257,955, Oct. 14, 1988, Pat. No. 4,952,439.

[51] Int. Cl.$^5$ .......................... B32B 1/06; A43B 5/04
[52] U.S. Cl. ..................................... 36/117; 428/72; 428/76
[58] Field of Search ................... 428/72, 76; 297/214; 5/455, 451, 450; 36/117

[56] References Cited

U.S. PATENT DOCUMENTS

| | | | |
|---|---|---|---|
| 3,237,319 | 3/1966 | Hanson | 36/2.5 |
| 3,402,411 | 9/1968 | Hanson | 12/142 |
| 3,635,849 | 1/1972 | Hanson | 260/2.5 |
| 3,807,793 | 4/1974 | Jacobs | 297/214 |
| 3,844,611 | 10/1974 | Young | 297/214 |
| 3,997,214 | 12/1976 | Jacobs | 297/214 |
| 4,038,762 | 8/1977 | Swan, Jr. | 36/89 |
| 4,083,127 | 4/1978 | Hanson | 36/93 |
| 4,108,928 | 8/1978 | Swan, Jr. | 264/26 |
| 4,144,658 | 3/1979 | Swan, Jr. | 36/117 |
| 4,229,546 | 10/1980 | Swan, Jr. | 521/55 |
| 4,243,754 | 1/1981 | Swan, Jr. | 521/55 |
| 4,370,769 | 2/1983 | Herzig et al. | 5/452 |
| 4,429,915 | 2/1984 | Flager | 297/199 |
| 4,445,240 | 5/1984 | Voorhees | 5/451 |
| 4,504,089 | 3/1985 | Calvert et al. | 297/214 |
| 4,724,560 | 2/1988 | Christie | 5/451 |
| 4,733,907 | 3/1988 | Fellenbaum | 297/188 |
| 4,803,744 | 2/1989 | Peck et al. | 5/453 |
| 4,952,439 | 8/1990 | Hanson | 428/72 |

OTHER PUBLICATIONS

1/1986 Pearl Izumi Bicycle Clothing for Racing and Touring Catalog, Shimizu–Jacobs, Inc. (p. 13).

*Primary Examiner*—Alexander S. Thomas
*Attorney, Agent, or Firm*—Sheridan, Ross & McIntosh

[57] ABSTRACT

A padding device is provided comprising a flowable material and/or low compression set foam. The flowable material comprises discrete particles dispersed in a wax and oil base. The padding device is particularly suitable for use in seating cushions, including bicycle seat cushions. A method for securing the padding device to a bicycle seat is also disclosed.

2 Claims, 4 Drawing Sheets

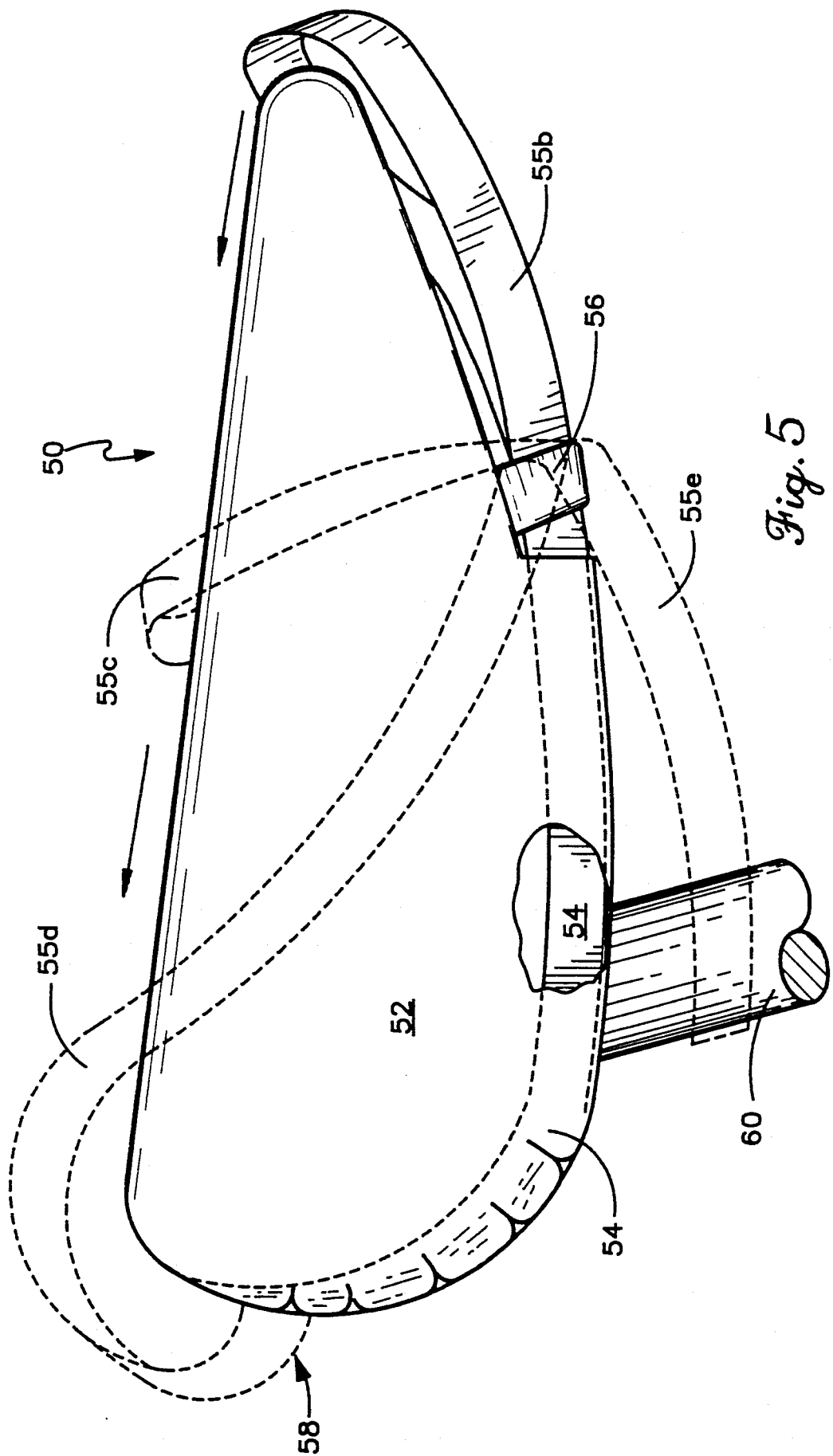

PADDING DEVICE

RELATED APPLICATION

This application is a divisional application of U.S application Ser. No. 07/257,955 filed Oct. 14, 1988 now U.S. Pat. No. 4,952,439 and commonly assigned.

1. Field of the Invention

This invention relates generally to the field of padding devices, and in particular, to padding devices used on seats such as bicycle seats.

2. Background of the Invention

Various padding devices have been employed in the past. Examples include liquid- or gas-filled bladders, e.g. water-filled cushions and pneumatic pads; and gases or liquids dispersed in a solid material, e.g. foams and gels. Generally, such padding devices operate on the principle of conformation to the shape of an object when placed under pressure. When a force, such as a person's mass, is placed on such a padding device, the device deforms so as to conform to the shape of the pressure applying object in order to distribute the force over as large an area as possible. These devices perform adequately when the object being padded has a relatively large, uniformly shaped surface area. However, when the object being padded includes a relatively small area of concentrated force, such as that caused by a sharp protuberance, the prior art padding devices often do not perform adequately. This is because the padding devices exert greater pressure on the area of concentrated force.

The reason for the greater pressure is that the prior art padding devices deform by compressing. Therefore, a sharp protuberance would compress the padding device more than the surrounding areas and, as a result, the padding device presses back with greater force in these areas. Such areas of high pressure are especially undesirable when the protuberance is a bone, such as an ankle or ischial tuberosity. The high pressure can lead to discomfort and, after periods of extended use, to actual damage to the tissue overlying the protruding bone.

The problem can be described with reference to a padding device comprising a gas dispersed in a solid material, e.g. foam. Tiny gas bubbles in foam act like millions of coil "springs". When required to conform to an irregular shape, such as a human body, the "springs" are compressed to varying degrees, each pushing back on the body with a force proportional to the amount of compression. Intimate conformity is best obtained with a relatively soft foam, which can be compared to weak "springs". The pressure on protuberances, where the "springs" are greatly compressed, will be relatively high, possibly causing pain and reduced circulation. The problem is even more pronounced if a stiffer foam is employed and the "springs" are stronger.

In order to alleviate the problem of differential pressure inherent with many prior art padding devices, a flowable, pressure-compensating material was developed. This material is described in U.S. Pat. No. 3,237,319 by Alden Hanson, issued Mar. 1, 1966; U.S. Pat. No. 3,402,411 by Alden Hanson, issued Sept. 24, 1968; U.S. Pat. No. 3,635,849 by Alden Hanson, issued Jan. 18, 1972; U.S. Pat. No. 4,038,762 by Swan, Jr., issued Aug. 2, 1977; U.S. Pat. No. 4,083,127 by Chris Hanson, issued Apr. 11, 1978; U.S. Pat. No. 4,108,928 by Swan, Jr., issued Aug. 22, 1978; U.S. Pat. No. 4,144,658 by Swan, Jr., issued Mar. 20, 1979; U.S. Pat. No. 4,229,546 by Swan, Jr., issued Oct. 21, 1980; and U.S. Pat. No. 4,243,754 by Swan, Jr., issued Jan. 6, 1981. Each of these U.S. patents is hereby incorporated by reference in its entirety.

In use, the flowable, pressure-compensating materials disclosed in the above-mentioned patents are typically placed in a pliable package, such as between two leak-proof resinous sheets which are sealed at the edges. The flowable materials act hydraulically. An applied force causes flowable material to migrate from areas of higher pressure to areas of lower pressure until pressure throughout the package is uniform. Once conformity has been achieved, force is distributed substantially equally over the entire surface of the package thus alleviating the differential pressure problems associated with prior devices. The viscosity of the flowable material can be varied. Higher viscosity does not decrease the ability of the flowable material to conform to the shape of the pressure applying object, only the speed at which it will migrate to conform. Flowable materials are presently sold under the registered trademark FLO-LITE (TM).

In spite of the advantages provided by the flowable materials, there are certain applications where improvement is desirable. In particular, improvement in the control of migration would be advantageous. Flowable material is presently typically packaged in a leak-proof container comprising two resinous sheets heat sealed together. One problem which occurs with this type of packaging is "bottoming out". Bottoming out occurs when the layer of flowable material in the package is insufficient to fully surround and support an object. As a result, a protuberance on an object can cause all of the flowable material to migrate laterally until no flowable material remains under the protuberance, and consequently the protuberance rests on the surface below the flowable material package. This reduces the effectiveness of the padding and increases the pressure on the end of the protuberance.

In order to alleviate the problem of excessive migration, additional flowable material can be added to the package. But this solution is unsatisfactory when the weight of the total package must be held to a minimum. Another possible solution is to restrict the migration of the flowable material by decreasing the effective surface area by segmenting the package into individual compartments. However, this deleteriously restricts the ability of the flowable material to conform to various shapes.

One application where the provision of adequate padding is problematic is on bicycle seats. Bicycle seats must be of relatively small size so that the seat itself does not interfere with the pedaling action of the rider's legs. Therefore, the rider's weight is concentrated over a relatively small area. This weight is further concentrated on the rider's ischial tuberosities. Additionally, the weight of the seat should preferably be held to a minimum. Several patents have issued for bicycle seats and bicycle seat covers which were designed to overcome the padding problems inherent in bicycle seat design.

U.S. Pat. No. 4,504,089 by Calvert et al., issued Mar. 12, 1985, discloses a liquid cushioned bicycle seat having separate forward and rear compartments. The forward pommel compartment has a longitudinal baffle to restrict side-to-side flow of the cushioning liquid. The rear saddle compartment has two side sections separated by a barrier which tapers towards the rear. The barrier terminates before reaching the rearward end of the saddle, thereby providing an opening connecting the side sections which permits side-to-side flow of the cushioning liquid. The pressure exerted on the first and second side sections cyclically increases and decreases within each section as the bicycle is pedaled. The rear opening serves as a baffle to control the direction and movement of cushioning liquid from one section to the other upon compression caused by pedaling.

The liquid cushioning media disclosed by Calvert et al. is preferably water. Due to water's low viscosity, it conforms to the shape of a pressure applying object almost instantaneously. Logically, it would appear that water would be an excellent cushioning material because of its capability to instantaneously flow to achieve conformability. However, incompressible materials which provide almost instantaneous conformability do not provide as much control and stability as padding materials which do not respond to instantaneously applied pressure. Anyone who has attempted to sit on a waterbed is familiar with the lack of stability associated with water cushioned devices.

U.S. Pat. No. 3,807,793 by Jacobs, issued Apr. 30, 1974, and U.S. Pat. No. 3,997,214 by Jacobs, issued Dec. 14, 1976, disclose compartmentalized bicycle seat covers. The compartments can be filled with foam rubber or a thixotropic or dilatant material. The thixotropic or dilatant material is defined as having a yield point of at least 4 grams per square centimeter and a viscosity between about 100,000 poise and about 40,000 poise at 0° F. and 80° F. This definition describes materials which are includable in the group of flowable, pressure-compensating materials described hereinbefore. The thickness of the padding is kept to a minimum and it is designed to conform to the pelvic configuration of the user and to retain that shape. In one embodiment, the padding material is a pressurized foam rubber which is injected in the compartments while the user is seated on the bike seat. The foam rubber material is claimed to have a viscosity substantially lower than the thixotropic or dilatant material. The cover can be clipped to a bike seat by clipping the rear end and using an elastic to secure the front end.

While the bicycle seat covers disclosed in the two Jacobs patents include the use of flowable materials in a compartmentalized manner, the designs disclosed therein suffer from a number of disadvantages. For example, while the compartmentalized containment of the flowable material in relatively thin layers of small area can help reduce bottoming out of sharp protuberances, it also limits the conformability of the flowable material over broader areas. In other words, as the area of the flowable material compartment decreases, the ability to conform to various shapes is reduced. Another disadvantage of the Jacobs design is the inability of the flowable material in the rear portion of the seat to flow from one side of the seat to the other. This prevents the seat from adjusting to anatomical differences between different riders, or asymmetries of a single rider, e.g. a rider who may sit with one pelvic bone closer to the seat than the other. Another disadvantage of the Jacobs design is that the cushioning material is capable of traveling down the center portion of the seat. As a result, if a rider rides forward on the seat, the pressure applied to the forward portion forces cushioning material towards the rear central portion. As can be appreciated, an excess of cushioning material in this area of the seat would be uncomfortable over periods of even short duration.

U.S. Pat. No. 3,844,611 by Young, issued Oct. 29, 1974, discloses a bicycle seat having two layers of resilient pad, a first upper layer of relatively low density and a second lower layer of relatively high density. The pad can comprise any resilient material, for example, sponge rubber, polyurethane and vinyl foams or the like. U.S. Pat. No. 4,429,915 by Flager, issued Feb. 7, 1984, discloses a bicycle seat having adjustable foam inserts to customize the seat to the rider. The inserts are formed from a foam such as polyurethane, preferably in a variety of densities or hardnesses. An air-filled tube is also used to adjust the shape of the seat. Different areas of the seat have different degrees of hardness or softness. U.S. Pat. No. 4,733,907 by Fellenbaum, issued Mar. 29, 1988, discloses a bicycle seat comprising foam having a density of 1.8–2.8 pounds per cubic foot and an impression force deflection of between 75 and 95 IFD. The foam is said to be resilient and preferably of an open cell nature, because a closed cell foam would be too stiff. The foam is preferably 1–1.5 inches thick. The foam over the front tongue can be as thin as ¼ inch.

One problem encountered with padding devices for bicycle seats, such as those disclosed in the patents by Young, Flager, and Fellenbaum, is that the resilient foam and/or air-filled tube disclosed in these patents provide substantially instantaneous conformability to the rider's shape. This is consistent with the long-held belief that a resilient, and therefore nearly instantaneously conforming, cushioning or padding device provides the best padding for a seat such as a bicycle seat. However, such padding devices do not evenly distribute weight, and the resulting pressure differential is undesirable in certain applications.

In summary, prior art padding devices which incorporated resilient materials or air- or water-filled tubes have been found to perform inadequately in certain applications. Additionally, bicycle seat padding devices which use flowable materials, such as those disclosed by Jacobs, have been found to have design deficiencies. Specifically, the compartmentalized design prevents total conformability and side-to-side movement of the flowable material, while permitting undesirable forward to rearward movement of the flowable material down the center portion of the bicycle seat. Therefore, it would be advantageous to have a padding device which overcame the deficiencies of the prior art.

BRIEF DESCRIPTION OF THE INVENTION

In accordance with the present invention, a padding device is provided comprising flowable material and/or low compression set foam.

The flowable material can be located throughout the entire padding device, or alternatively it can be located in selected areas. In a preferred embodiment, the flowable material is present in multiple layers. The multiple layer configuration provides numerous advantages. For example, flowable materials having different viscosities can be placed in the separate layers. In this manner, the effectiveness of the padding device can be improved. Another advantage of a multiple layer configuration is the alleviation of the problem of bottoming out of sharp protuberances placed on the padding device, while simultaneously providing adequate conformability. Another advantage is that greater thickness (i.e. higher loft) can be achieved in selected areas without having to increase the amount of flowable material throughout the entire padding device, thus keeping total weight to a minimum. Yet another advantage is that separate layers allow for the containment of at least some flowable material in the event that part of the packaging envelope is compromised, e.g. by puncturing, etc. A preferred application of the multiple layer package of flowable material is for use in a bicycle seat.

In accordance with another embodiment of the present invention, a padding device comprising a layer of low compression set foam is provided. The low compression set foam is characterized in that when it is compressed for a sufficient period of time, it will partially retain the shape of the object which applied the compressive force after the force is removed. Low compression set foams differ from highly-resilient foams, which return to their original shape after a compressive force is removed. Highly-resilient foams push back with greatest force on the object which is applying the compressive force at areas of greatest compression. As a result, a pressure differential exists across the surface of an unequally compressed highly-resilient foam. Sharp protuberances are subject to the highest pressure. Low compression set foams, on the other hand, partially lose their resiliency after extended periods of compression or deflection. Once a low compression set foam has adjusted to the shape of its user, the pressure differential over its surface will be less than that for a highly-resilient foam, e.g., the pressure will be more evenly distributed. However, low compression set foams typically retain some resiliency. Because low compression set foams combine the advantages of conformability and resiliency, they have been found to perform especially well when combined with flowable material in a padding device.

In accordance with another embodiment of the present invention, a method is provided to secure a bicycle seat cover to a bicycle seat. The method includes partially enclosing an elastic band within the lower edge of a fabric bicycle seat cover. A portion of the elastic band which is not enclosed within the lower edge is pulled through a small loop. The elastic band can then be pulled up and over one end of the bicycle seat and then down and under the other end. Upon release, the elastic band is pulled against the bicycle seat support post and thereby secures the bicycle seat cover to the bicycle seat.

BRIEF DESCRIPTION OF THE DRAWINGS

FIG. 5 is a side view of the bicycle seat cover of FIG. 4 showing in stepwise fashion the drawstring being drawn over the bicycle seat.

DETAILED DESCRIPTION OF THE INVENTION

Figures 1, 2:
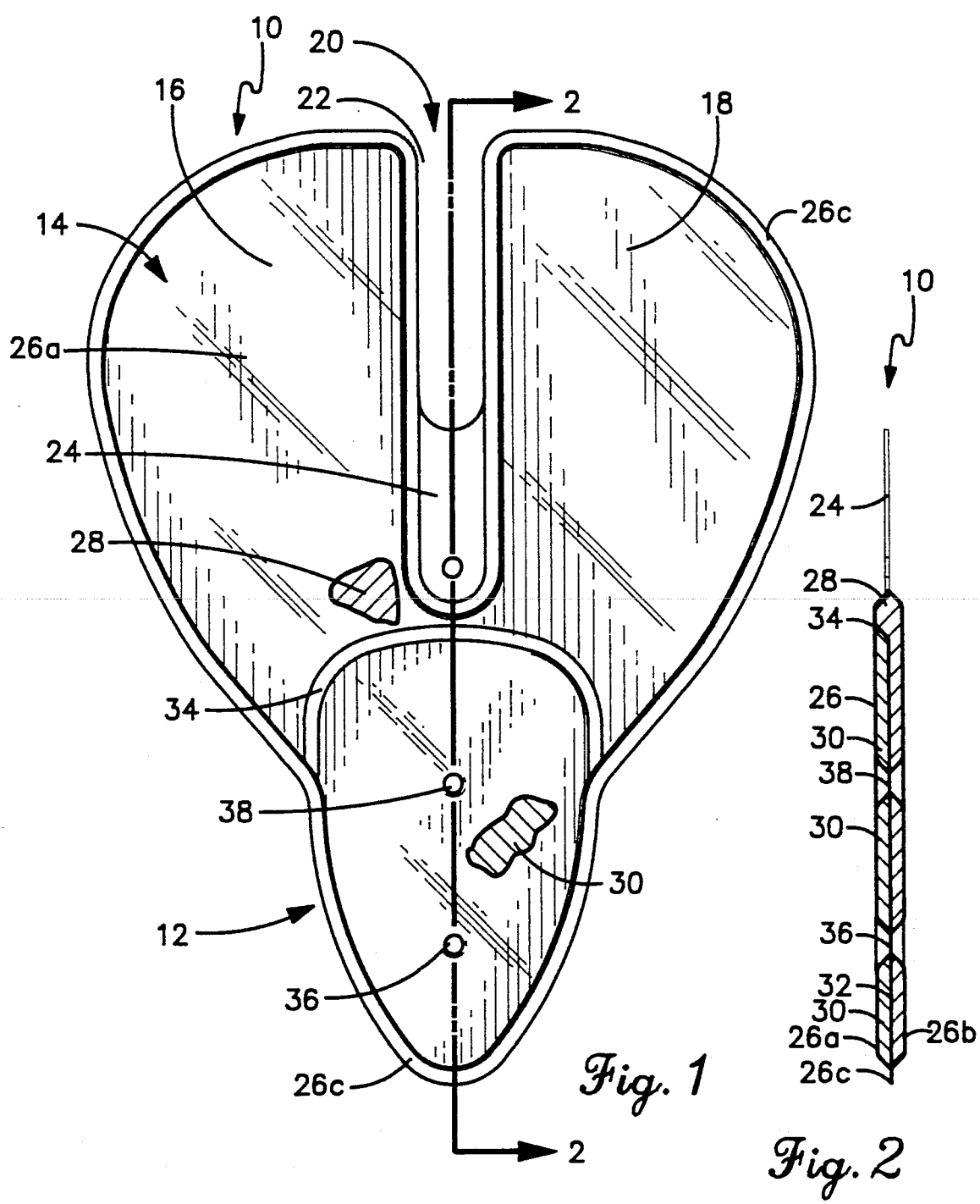
FIG. 1 illustrates a top view of a flowable material package in accordance with one embodiment of the invention.
FIG. 2 illustrates a cross-sectional view of the padding device of FIG. 1 taken along lines 2—2 of FIG. 1.

The present invention will be described with reference to the attached figures. FIG. 1 shows a top view of a padding device 10 comprising flowable materials 28 and 30 contained in pliable package 26.

The flowable materials comprise a combination of (1) a two-component base of wax and oil, and (2) discrete particles. The particles can include, e.g. glassy, siliceous or ceramic micro-beads. Flowable materials are described in greater detail in U.S. Pat. Nos. 3,237,319; 3,402,411; 3,635,849; 4,038,762; 4,083,127; 4,108,928; 4,144,658; 4,229,546; and 4,243,754 which are incorporated herein by reference in their entirety.

The flowable material, when placed in a container such as an elastomeric envelope, is viscous, but flows and conforms under controlled or selective pressure loads. More specifically, the pressure compensating material is flowable or formable. It conforms or deforms to an irregular shape. It substantially retains that shape when relieved of deforming pressure. It does not "sag" or slump significantly upon storage at ambient temperatures.

The shape of the flowable material may be changed, for example, by the application of continuously applied pressure or shear stress that exceeds some desired minimum level. After the "yield point" of the flowable material is reached, it flows under shear stress. In this respect, the flowable material responds in a manner generally expected of a liquid. When the flowable material is confined, for example, within an envelope enclosure, during conditions of use the flowable material migrates in response to continually applied pressure, and is resistant to flow in response to instantaneously applied pressure.

The flowable material does not constantly apply pressure, as it would if it were too resilient. It does not flow too quickly or too responsively, otherwise it would not resist flow in response to instantaneously applied pressure, while flowing in response to continuously applied pressure. The confined flowable material undergoes flow and deformation away from the areas of highest pressure loads.

The padding device 10, as shown in FIG. 1, is configured to be used on a bicycle seat. As will be appreciated by those skilled in the art, alternative configurations can be employed depending upon the specific application in which the padding device is to be used. The padding device 10 comprises a narrow forward section 12 and a wider rear section 14. The wider rear section 14 is separated into two side sections 16 and 18. The left rear section 16 is partially separated from the right rear section 18 by a barrier 20. The barrier 20 preferably is at least ¼th the total length of the padding device 10, measured from front to rear. In a preferred embodiment, the barrier section 20 includes an open area 22 and a sealed area 24 made up of material sealed in a manner to prevent the entry of flowable material 28 into the sealed area 24.

The barrier 20 provides numerous advantages. For example, it prevents the accumulation of flowable material under a portion of the human anatomy where such accumulation is undesirable. The barrier 20 allows the padding device 10 to more easily conform to the shape of a bicycle seat, which is similar to that of a hyperbolic paraboloid. However, if the open area 22 of the barrier 20 is too long, the rear side sections 16 and 18 can spread too far apart. Additionally, the barrier 20 can controllably restrict the migration of flowable material 28 between side section 16 and side section 18. In other words, the flowable material must circumvent barrier 20 in order to migrate from side to side. Therefore, by the proper selection of the length of barrier 20, the speed at which the flowable material can migrate between side section 16 and side section 18 can be controlled. It will be appreciated by those skilled in the art that the barrier 20 can comprise all open area 22, all sealed area 24, or a combination of the two, as shown in FIG. 1.

As illustrated in FIG. 2, the padding device 10 comprises an enclosure envelope 26 surrounding flowable materials 28 and 30. The forward portion 12 of the padding device 10 includes a multi-layer flowable material configuration. The first layer 28 of flowable material is distributed substantially throughout the extent of the padding device 10 while the second layer 30 is located solely in the forward portion 12. The first layer 28 is separated from the second layer 30 by a barrier 32.

Numerous advantages are provided by the multiple layer configuration illustrated at the front portion 12 of the padding device 10. The flowable material 28 in the first layer can be the same or different than the flowable material 30 in the second layer, depending upon the particular application. For example, the flowable material 28 may be of a relatively higher viscosity, thereby providing a slower migration speed. The flowable material 30 can be of a relatively lower viscosity, thereby providing a higher migration speed at certain areas of a bicycle seat. This is especially desirable toward the front narrow portion 12 of the bicycle seat padding device 10 due to the area of the human anatomy which contacts this area 12. Another advantage is that the multiple layer design helps prevent bottoming out of sharp protuberances placed on the multiple layer area. This is typically accomplished by providing a first layer in which the migration of the flowable material is relatively unrestricted. Therefore, the flowable material 28 in the first layer can migrate to conform to a wide variety of shapes. The flowable material 30 in the second layer can be more restricted, to prevent total freedom of migration. Although this reduces the effectiveness of conformability in the second layer, bottoming out is alleviated. When these two layers of flowable material 28 and 30 are combined, a multi-layer configuration which provides adequate conformability while alleviating bottoming out is provided. An additional advantage is that if the seal in one of the layers is compromised, the other layer provides backup padding.

Another advantage with multi-layer configurations is found when flowable material is injected into an envelope in order to custom fit an object, such as a ski boot. In such an application, an envelope is typically placed within an enclosure, such as a ski boot, and the object to be fit, e.g. a foot, is placed within the boot. Flowable material is then injected into the envelope until a custom fit is obtained. However, in the past the flowable material had to be less than a certain maximum viscosity in order to be easily injectable. With a multi-layer design, a minimum amount of high viscosity flowable material can be placed inside the boot prior to the custom fitting operation. Subsequently, during this custom fitting operation, a smaller quantity than previously required of lower viscosity flowable material can be injected into the envelope in order to obtain the custom fit. In this manner, the advantages of a higher viscosity flowable material can be obtained without precluding the use of a custom fitting operation which requires the use of a lower viscosity flowable material. Surprisingly, it has been found that in a confined space, the two layers behave substantially like a single layer, e.g. as if the barrier separating the two layers did not exist.

The multi-layer configurations can be provided by providing a single envelope 26 having a barrier layer 32 separating the two different layers, as shown in FIGS. 1 and 2. Alternatively, two separate envelopes can be placed adjacent one another in order to provide the multi-layer configuration.

The enclosure envelope 26 can comprise any material capable of containing the flowable material. Preferably, the material is pliable. The enclosure envelope 26 preferably comprises a first top sheet of elastomeric material 26a and a second bottom sheet of elastomeric material 26b between which flowable material 28 is placed. The two sheets are heat sealed at the periphery 26c in order to contain the flowable material 28. The barrier 32 which contains the second layer of flowable material 30 can also comprise an elastomeric material which is heat sealed along the front of edges 26c and intermediate seal 34 (as shown in FIG. 1).

The front portion 12 of the padding device 10 includes areas, as shown by circles 36 and 38, where the bottom enclosure layer 26b is directly attached to the top enclosure layer 26a, with no flowable material therebetween. These connected areas 36 and 38 provide a number of advantages. For example, the areas can prevent excessive loft, that is they can prevent lower layer 26b from separating too far from upper layer 26a. The connecting portions 36 and 38 can also act to controllably restrict the side-to-side flow or migration of flowable material. Additionally, the connecting areas 36 and 38 can substantially prevent relative lateral motion between top layer 26a and bottom layer 26b, i.e they can prevent "rolling" The sealed area 24 can be extended in a forward direction to replace one or both of the sealed areas 36 and 38.

Figure 3:
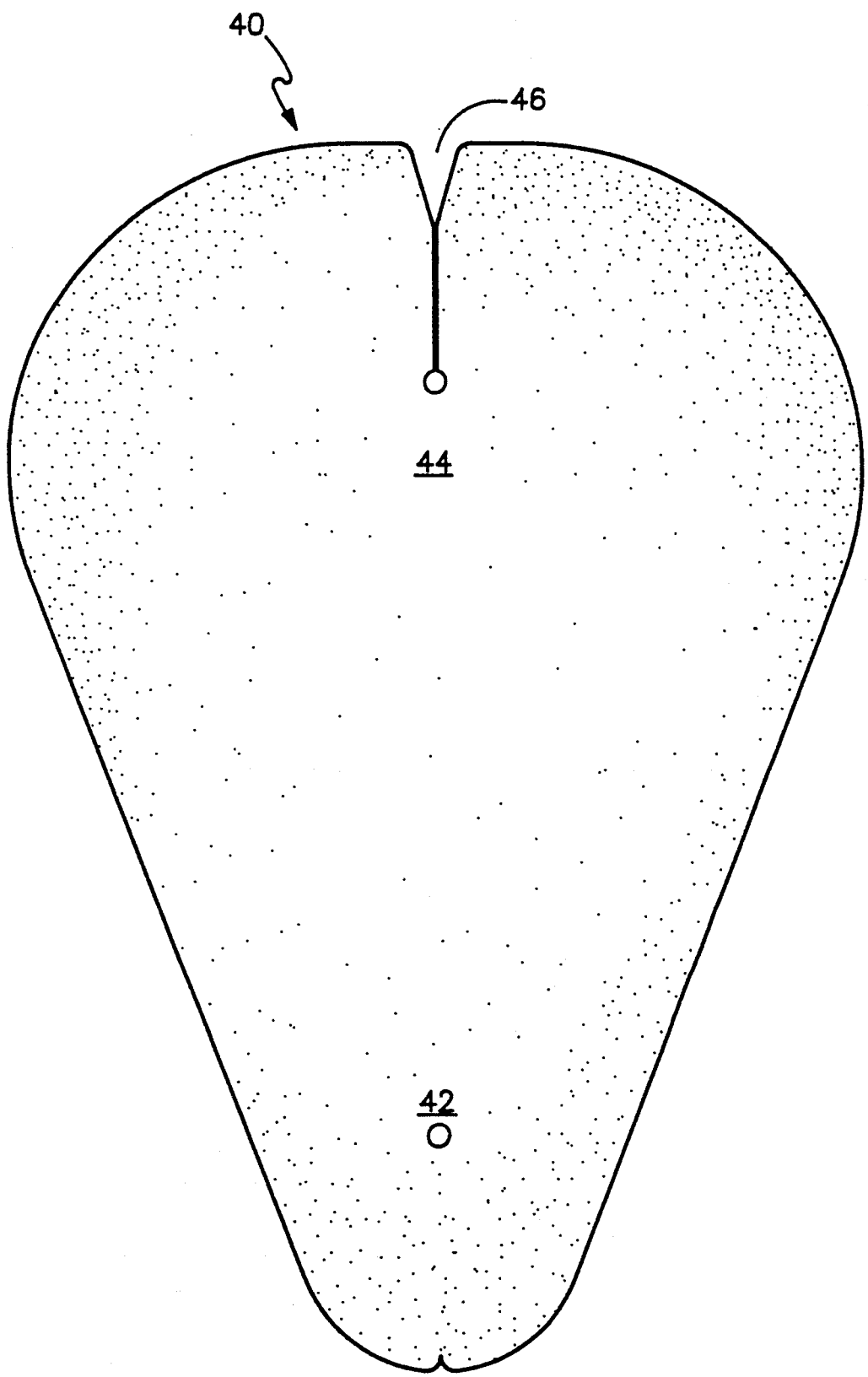
FIG. 3 illustrates a top view of a low compression set foam padding device in accordance with one embodiment of the present invention.

In accordance with another embodiment of the present invention, a padding device comprising low compression set foam is provided. Preferably the foam is a closed cell foam. Low compression set foam may comprise, e.g. cross-linked or uncross-linked polyethylene. As shown in FIG. 3, the padding device 40 can comprise, e.g. a padding device for use on a bicycle seat. The padding device 40 can include a narrow front portion 42 and a wide rear portion 44. Additionally, a slit 46 can be provided so that the padding device 40 can better accommodate the shape of a bicycle seat, i.e. a shape similar to a hyperbolic paraboloid.

The amount of low compression set a foam possesses can be quantified using the ASTM constant deflection compression set rating. The ASTM constant deflection compression set is measured as a percentage of original thickness, based on a deflection of 50%. The method consists of deflecting the foam specimen under specified conditions of time and temperature and noting the effect on the thickness on the specimen. The foam is deflected by two flat plates held parallel to each other by bolts or clamps. In order to calculate the ASTM constant deflection compression set, a piece of foam is compressed to 50% of its original thickness. The deflection is maintained for a period of 22 hours. The foam is then allowed to recover for 24 hours. The thickness of the foam is then measured again. The ASTM constant deflection compression set, Cd, expressed as a percentage of the original thickness, is calculated as follows:

$$C_d = [(t_o - t_f)/t_o] \times 100$$

where $t_o$ = the original thickness and $t_f$ = the final thickness. The ASTM constant deflection compression set test is performed in compliance with ASTM D-3575-84 which is described in the 1985 Annual Book of ASTM Standards, Section 9, in the chapter "Standard Test Methods For Flexible Cellular Materials Made From Olefin Polymers."

In accordance with one embodiment of the present invention, padding devices employing low compression set foams having an ASTM rating of greater than 20%, and preferably greater than 35%, are provided. In accordance with another embodiment, padding devices comprising a combination of low compression set foam and flowable materials are provided. Because the characteristics of flowable material and low compression set foam complement one another, low compression set foams with ASTM ratings as low as 10% have been found to be useful when employed in combination with flowable material. It has also been found that the low compression set foam, when combined with the flowable material, helps to retain the shape of the padding device. Low compression set foam also alleviates problems associated with bottoming out of flowable material.

Figure 4:
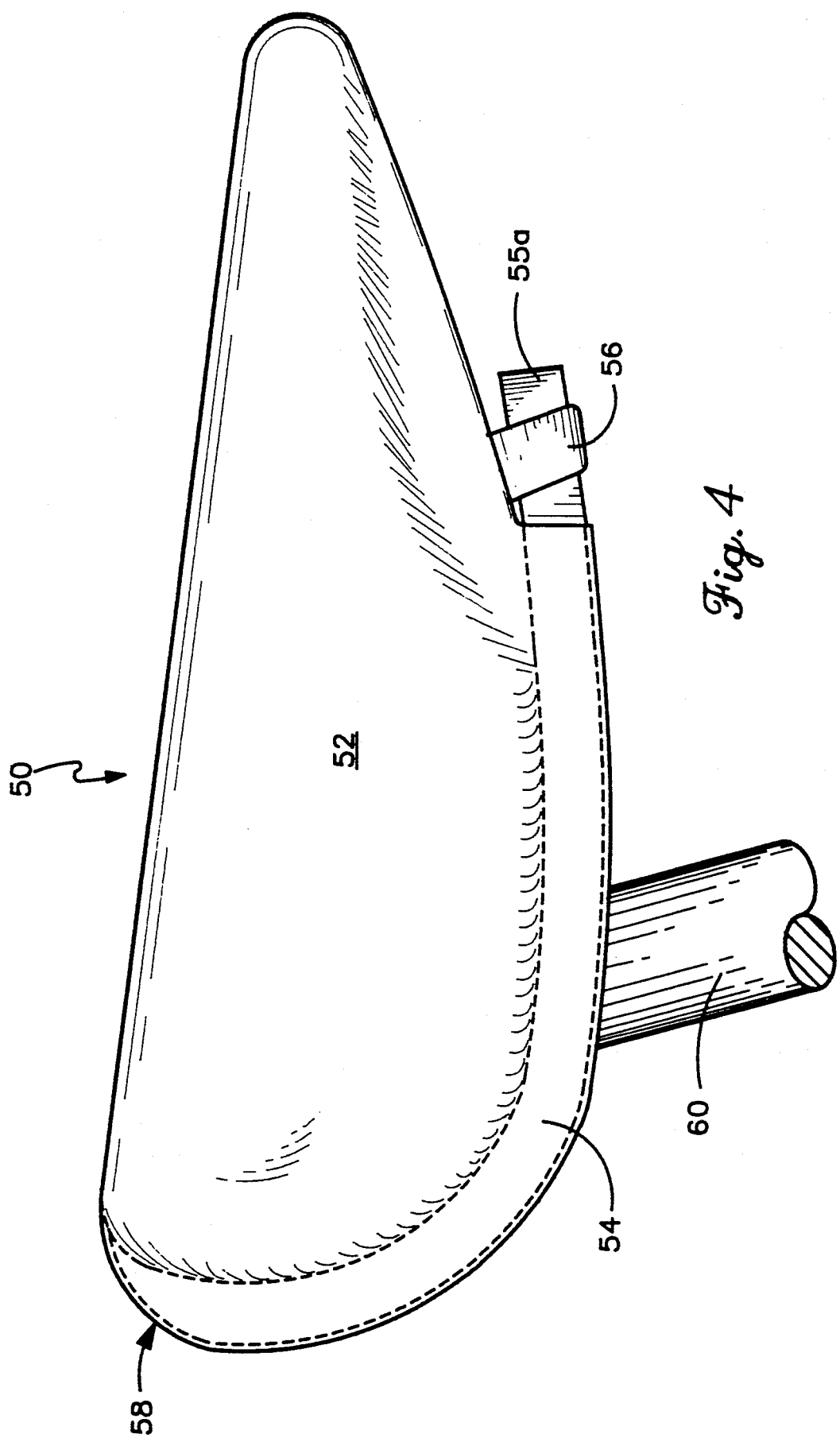
FIG. 4 is a side view of a bicycle seat cover shown placed over a bicycle seat.

In another embodiment of the present invention a device and method for securing a bicycle seat cover to a bicycle seat is provided. This embodiment is illustrated in FIGS. 4 and 5. The bicycle seat cover comprises a covering 52, preferably of cloth or fabric. A drawstring 54 is enclosed within the lower edge of the covering 52. The enclosed portion of the drawstring 54 is partially shown in phantom lines. The enclosure can be accomplished, e.g. by folding the lower edge of the covering 52 around the drawstring 54 and sewing it to form a channel. Alternatively, the drawstring can be threaded through a preexisting channel. A small loop 56 is attached to the forward lower edge of the covering 52. The drawstring 54 extends through the small loop 56. The small loop 56 can comprise a single loop through which the entire drawstring 54 is drawn, or alternatively, it can comprise two separate loops through which each half of the drawstring can be drawn. The forward portion of the drawstring forms a loop shown as 55a in FIG. 4. Preferably the drawstring 54 is a loop of flat elastic band.

As illustrated in FIG. 5, the cover 50 is secured to the bicycle seat by: (1) drawing the loop 55a forwardly and upwardly as shown by 55b; (2) pulling the loop rearwardly over the top of the seat as shown in phantom lines 55c; (3) continuing rearwardly and then downwardly as shown in phantom lines 55d; and (4) releasing the drawstring 54 and allowing it to contact the bicycle seat support post 60 as shown in phantom lines 55e. In this manner the cover 50 is secured to the seat.

As can be seen by observing the rear portion 58 of the cover in FIGS. 4 and 5, when the drawstring is drawn over the seat in this manner it pulls the cover 52 inwardly so that it is secured about the bottom of the bicycle seat. As will be appreciated by those skilled in the art, other methods for securing the bicycle seat cover to the bicycle seat can be employed. The bicycle seat covering 52 can be a piece of fabric, or alternatively it can be a combination of fabric and low compression set foam. A preferred fabric is LYCRA (TM).

While various embodiments of the present invention have been described in detail, it is apparent that modifications and adaptations of those embodiments will occur to those skilled in the art. However, it is to be expressly understood that such modifications and adaptations are within the spirit and scope of the present invention, as set forth in the following claims.

What is claimed is:

1. A ski boot having a padding device in the interior, said padding device comprising:
   a) a first layer of flowable material which is resistant to flow in response to instantaneously applied pressure and flows in response to continuously applied pressure, said first layer of flowable material being further characterized in that it is capable of deforming into an irregular shape in response to said continuously applied pressure and is capable of substantially retaining said irregular shape after all applied pressure is removed, said first layer of said flowable material located at selected portions of said padding device; and
   b) a second layer of flowable material which is resistant to flow in response to instantaneously applied pressure and which flows in response to continuously applied pressure, said second layer of flowable material being further characterized in that it is capable of deforming into an irregular shape in response to said continuously applied pressure and is capable of substantially retaining said irregular shape after all applied pressure is removed, said second layer of flowable material located substantially adjacent to at least selected portions of said first layer of flowable material.

2. A ski boot comprising:
   a) a hard outer shell;
   b) a first layer of flowable material located at selected portions within said hard outer shell which is resistant to flow in response to instantaneously applied pressure and flows in response to continuously applied pressure, said first layer of flowable material being further characterized in that it is capable of deforming into an irregular shape in response to said continuously applied pressure and is capable of substantially retaining said irregular shape after all applied pressure is removed; and
   c) a second layer of flowable material wherein said second layer of flowable material overlaps said first layer of flowable material at least at some portions and which is resistant to flow in response to instantaneously applied pressure and which flows in response to continuously applied pressure, said second layer of flowable material being further characterized in that it is capable of deforming into an irregular shape in response to said continuously applied pressure and is capable of substantially retaining said irregular shape after all applied pressure is removed.

* * * * *